United States Patent [19]
Nakano et al.

[11] Patent Number: 6,088,483
[45] Date of Patent: Jul. 11, 2000

[54] IMAGE PROCESSING METHOD FOR SYSTEM EMPLOYING PATTERN MATCHING

[75] Inventors: Hiroki Nakano, Otsu; Masahiko Kitagawa, Kusatsu; Akira Yanagawa, Hikone, all of Japan

[73] Assignee: International Business Machines Corporation, Armonk, N.Y.

[21] Appl. No.: 09/093,708

[22] Filed: Jun. 8, 1998

[30] Foreign Application Priority Data

Jul. 2, 1997 [JP] Japan .................................. 9-177339

[51] Int. Cl.$^7$ .............................. G06K 9/62; G06K 9/68; G06K 9/64; G06K 9/36; G06F 17/15
[52] U.S. Cl. .......................... 382/209; 382/22; 382/278; 382/283; 364/728.03
[58] Field of Search .................................. 382/209, 212, 382/213, 217, 218, 219, 220, 278, 281, 282, 283; 364/728.03, 725.01

[56] References Cited

U.S. PATENT DOCUMENTS

| | | | |
|---|---|---|---|
| 5,751,286 | 5/1998 | Barber et al. | 382/209 |
| 5,790,702 | 8/1998 | Yoshimura | 382/209 |
| 5,805,727 | 9/1998 | Nakano | 382/195 |
| 5,809,171 | 9/1998 | Neff et al. | 382/209 |
| 5,943,442 | 8/1999 | Tanaka et al. | 382/216 |

*Primary Examiner*—Amelia Au
*Assistant Examiner*—Mehrdad Dastouri
*Attorney, Agent, or Firm*—Stephen C. Kaufman

[57] ABSTRACT

Provided are an image processing method employing pattern matching, whereby the number of calculations for a normalized correlation factor can be reduced and processing speed can be increased in a pattern matching process, and an image processing system therefor. In the pattern matching processing when an insensitive region is set in a template image, values (the sum and the squared sum) obtained during a previous operation for a prior search target sub-image are employed to perform calculations for a current search target sub-image, relative to coordinate sequence code that indicates the start point and the end point of a sequence of pixels having values of "1."

4 Claims, 9 Drawing Sheets

Search image and template image

Mask image R(i,j)

W'(i,j)

W'(i,j)

IMAGE PROCESSING METHOD FOR SYSTEM EMPLOYING PATTERN MATCHING

FIELD OF THE INVENTION

The present invention relates to an image processing method, a pattern matching apparatus, an image processing system, and a recording medium on which is recorded a pattern matching control program. More specifically, the present invention pertains to a process for matching a template image and an image to be searched for when both an insensitive region and a sensitive region are present in a template.

BACKGROUND ART

A conventional, fast pattern matching process for a template image and an image in a search region is disclosed in, for example, Japanese Unexamined Patent Publication No. Hei 5-298451, Japanese Examined Patent Publication No. Sho 62-11389, and Japanese Unexamined Patent Publication No. Sho 62-249293. In the example disclosed in Japanese Unexamined Patent Publication No. Hei 5-298451, Hadamard's transformation is employed for the pattern matching. To calculate a Hadamard factor, a Hadamard factor that was previously obtained is employed and calculations are performed only for portions that have changed, so as to reduce the number of calculations required and to provide fast processing.

In the example disclosed in Japanese Examined Patent Publication No. Sho 62-11389, a pattern recognition technique is employed whereby the outline of the elements included in a pattern is traced to acquire pattern information. One point is extracted for each element while at the same time pattern linkage is detected, so that a start point for tracing can be detected within a short period of time.

In the example disclosed in Japanese Unexamined Patent Publication No. Sho 62-249293, a technique is employed whereby image data are recognized by using a template. The degree to which the run-length coding data for the image data match a template comprising run-length data is measured directly, so that a process whereby run-length coding data are decoded to obtain binary image data is eliminated, and fast processing can be performed.

Other conventional examples resembling pattern matching are disclosed in Japanese Unexamined Patent Publication Nos. Hei 2-68682, Hei 4-337889, Hei 8-30784 and Hei 8-54221.

SUMMARY OF THE INVENTION

However, when pattern matching is to be performed by employing a normalized correlation factor, there is a possibility that an insensitive region will be set in an area of a template. Conventionally, in order to calculate a normalized correlation factor when an insensitive region is set, a mask image that consists of a sensitive region composed of "1," and an insensitive region composes of "0" is multiplied by a partial area of an image to be searched for that corresponds to the template area. In this case, each time the template area is shifted one pixel, the mask image should be multiplied by the partial area of the image to be searched for. Therefore, the amount of calculations is enormous compared with an instance when an insensitive region is not set.

An explanation will be given by employing a specific example.

As is shown in FIG. 3, assuming that a template image, $U(i, j)$, is formed of a rectangular region comprising M×M pixels, and that an image to be searched for, $W(i, j)$, is formed of a rectangular region comprising L×L pixels (M<L).

First, a process that is performed when an insensitive region is not set will be explained. In this case,

[Equation 1]

$$Cr = \frac{\sigma^2_{UW}}{\sqrt{\sigma^2_U \cdot \sigma^2_W}} \qquad (1)$$

is employed to represent normalized correlation factor Cr.

$\sigma^2_U$ denotes a variance of template image $U(i, j)$, $\sigma^2_W$ denotes a variance of search image $W(i, j)$ that is the same size of the template, and $\sigma^2_{UW}$ denotes a covariance of the images $U(i, j)$ and $W(i, j)$.

When the template image $U(i, j)$ has a rectangular shape, $\sigma^2_{UW}$, $\sigma^2_U$, and $\sigma^2_W$ are obtained by the following equations.

[Equation 2]

$$\sigma^2_{UW} = \frac{\sum_M \sum_M (U(i,j) - \overline{U})(W(i,j) - \overline{W})}{M^2} \qquad (2)$$

[Equation 3]

$$\sigma^2_U = \frac{\sum_M \sum_M (U(i,j) - \overline{U})^2}{M^2} \qquad (3)$$

[Equation 4]

$$\sigma^2_W = \frac{\sum_M \sum_M (W(i,j) - \overline{W})^2}{M^2} \qquad (4)$$

It should be noted that

[Equation 5]

$$\overline{U} = \frac{\sum_M \sum_M U(i,j)}{M^2} \qquad (5)$$

[Equation 6]

$$\overline{W} = \frac{\sum_M \sum_M W(i,j)}{M^2} \qquad (6)$$

Since pattern matching is the process employed for searching the image $W(i, j)$ and for acquiring coordinates that have the maximum correlation factor, the number of multiplications for this process is about $2(L'M)^2$, wherein $L'=L-M$.

Then, a process employed when the insensitive region is set in the template image $U(i, j)$ will be explained for the performance of pattern matching even for a non-rectangular image that is to be searched for.

As is shown in FIG. 4, a mask image that includes an insensitive region is assumed to be $R(i, j)$, and a sensitive region is set to 1 and an insensitive region is set to 0.

Since each time the template image $U(i, j)$ is shifted one pixel a mask image should be multiplied by a corresponding portion of the image $W(i, j)$ to be searched for, the number of multiplications required for this process is approximately $3(L'M)^2$. When $M=100$ and $L'=400$, for example, the total number of multiplications required to search the entire screen is 4.8 billion.

As is described above, apparently, a great number of normalized correlation factor calculations is required for the conventional pattern matching processing performed when the insensitive region is set in the template image $U(i, j)$, and the operation speed is very slow.

[Problems to be Solved by the Invention]

It is, therefore, an object of the present invention to provide an image processing method employing pattern matching, whereby the number of calculations for a normalized correlation factor can be reduced and processing speed can be increased in a pattern matching process when an insensitive region is set in a template image, and an image processing system therefor.

To achieve the above object, according to the present invention, an image processing method for matching a template image and a search image comprises the steps of: capturing a reference image to generate, from the captured image, a template image having an insensitive region and a sensitive region; generating in an image raster direction in a mask image of the same size as the generated template image, based on a sequence of pixel values corresponding to the sensitive region, a coordinate sequence code having coordinates for a start point and for an end point of the sensitive region; multiplying the mask image having the pixel values by the template image to acquire a variance for the template image having a mask; capturing the search image, and obtaining a covariance for the captured image and the template image having the mask by performing a multiplication and accumulation operation for the captured image and the template image having a mask; multiplying the search image by the mask image having the coordinate sequence of the pixel values and calculating the sum and the squared sum of a search image with a mask to be searched for; subtracting the sum of the search image having the mask corresponding to pixel values for the coordinate sequence of the start points, from the sum of the search image having the mask corresponding to pixel values for the coordinate sequence of the end points; subtracting the squared sum of the search image having the mask corresponding to pixel values for the coordinate sequence of the start points, from the squared sum of the search image having the mask corresponding to pixel values for the coordinate sequence of the end points; acquiring, from the sum and the squared sum of the search image having the mask, a variance for the search image having the mask having the same size as the template image having the mask; calculating a normalized correlation factor by employing the variance for the template image having the mask, the covariance and the variance for the search image having the mask being searched for; and determining whether the template image matches the image being searched for by calculating a coordinate value for which the normalized correlation factor is the maximum.

In addition, according to the present invention, an image processing apparatus, for matching a template image and a search image, comprises: means for capturing a reference image to generate, from the captured image, a template image having an insensitive region and a sensitive region; means for generating in an image raster direction in a mask image of the same size as the generated template image, based on a sequence of pixel values corresponding to the sensitive region, a coordinate sequence code having coordinates for a start point and for an end point of the sensitive region; means for multiplying the mask image having the pixel values by the template image to acquire a variance for the template image having a mask; means for capturing the search image, and obtaining a covariance for the captured image and the template image having the mask by performing a multiplication and accumulation operation for the captured image and the template image having a mask; means for multiplying the search image by the mask image having the coordinate sequence of the pixel values and for calculating the sum and the squared sum of a search image with a mask to be searched for; means for subtracting the sum of the image having the mask corresponding to pixel values for the coordinate sequence of the start points, from the sum of the search image having the mask corresponding to pixel values for the coordinate sequence of the end points; means for subtracting the squared sum of the search image having the mask corresponding to pixel values for the coordinate sequence of the start points, from the squared sum of the search image having the mask corresponding to pixel values for the coordinate sequence of the end points; means for acquiring, from the sum and the squared sum of the search image having the mask, a variance for the search image having the mask having the same size as the template image having the mask; means for calculating a normalized correlation factor by employing the variance for the template image having the mask, the covariance and the variance for the search image having the mask being searched for; and means for determining whether the template image matches the image being searched for by calculating a coordinate value for which the normalized correlation factor is the maximum.

Further, according to the present invention, the image processing system, further comprises: reference image preparation means for preparing the reference image; and search target image input means for capturing the image.

Furthermore, according to the present invention, provided is a recording medium on which is recorded a control program for enabling a computer to match a template image and a search image, the control program enabling the computer to perform the processes for: capturing a reference image to generate, from the captured image, a template image having an insensitive region and a sensitive region; generating in an image raster direction in a mask image of the same size as the generated template image, based on a sequence of pixel values corresponding to the sensitive region, a coordinate sequence code having coordinates for a start point and for an end point of the sensitive region; multiplying the mask image that has the pixel values and the template image to acquire a variance for the template image having a mask; capturing the search image, and obtaining a covariance for the captured image and the template image having the mask by performing a multiplication and accumulation operation for the captured image and the template image having a mask; multiplying the search image by the mask image having the coordinate sequence of the pixel values and calculating the sum and the squared sum of a search image with a mask to be searched for; subtracting the sum of the search image having the mask corresponding to pixel values for the coordinate sequence of the start points, from the sum of the search image having the mask corresponding to pixel values for the coordinate sequence of the end points; subtracting the squared sum of the search image having the mask corresponding to pixel values for the coordinate sequence of the start points, from the squared sum of the search image having the mask corresponding to pixel values for the coordinate sequence of the end points; acquiring, from the sum and the squared sum of the search image having the mask, a variance for the search image having the mask having the same size as the template image having the mask; calculating a normalized correlation factor by employing the variance for the template image having the mask, the covariance and the variance for the search image having the mask being searched for; and determining whether the template image matches the image being searched for by calculating a coordinate value for which the normalized correlation factor is the maximum.

[Advantages of the Invention]

As is described above, according to the present invention, for the pattern matching processing when an insensitive region is set in a template image, values (the sum and the squared sum) obtained during a previous operation for a prior search target sub-image are employed to perform calculations for a current search target sub-image, relative to coordinate sequence code that indicates the start point and the end point for a sequence of pixels having values of "1". As a result, the number of calculations required for a normalized correlation factor can be considerably reduced and the processing speed can be increased.

PREFERRED EMBODIMENT

The preferred embodiment of the present invention will now be described in detail while referring to the accompanying drawings. A sensitive region and an insensitive region that will be explained are defined as follows. The sensitive region is a partial image region in a template image that affects a score (normalized correlation factor) for pattern matching. The insensitive region is a partial image region that does not contribute to the score for matching, regardless of pixel values. For example, when in an image a search is performed for the face of a person standing in the foreground without the search being affected by the background, a template is generated wherein only the region for the face of the person is defined as a sensitive region and the background area is defined as an insensitive region. As a result, the face of a person can be searched for, regardless of the background. First, the schematic arrangement of a system according to the present invention will be described while referring to FIGS. 11 and 12.

Figure 11:
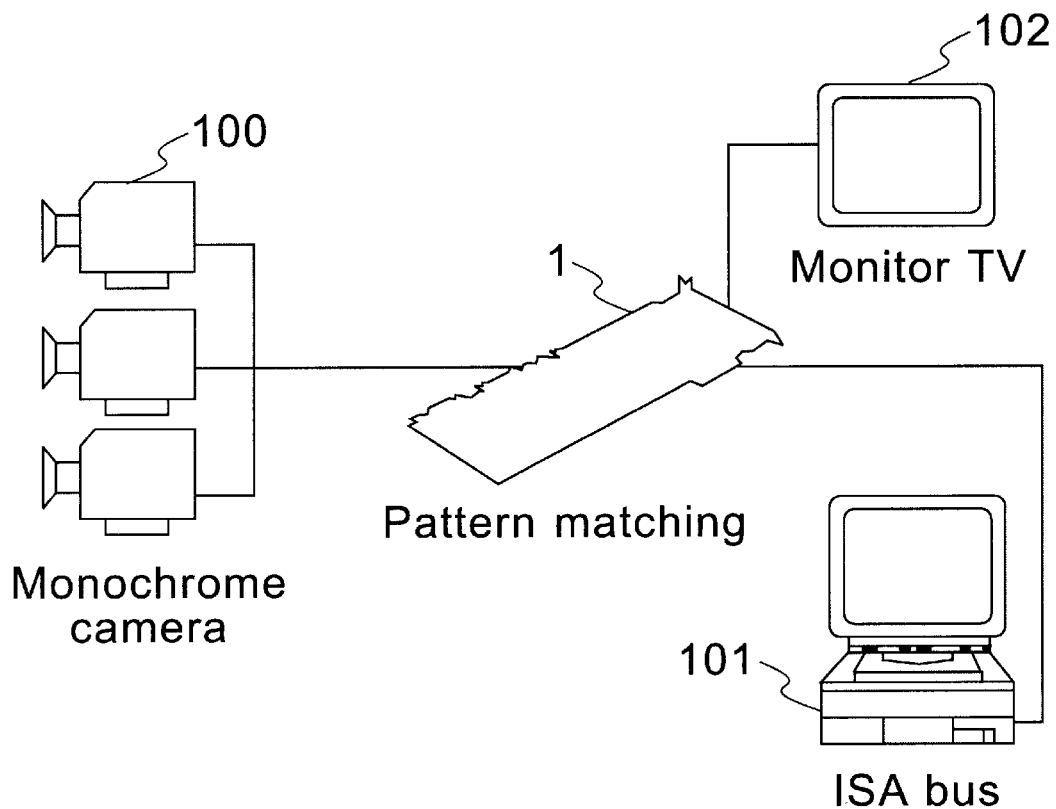
FIG. 11 is a block diagram illustrating an example arrangement of a system according to the present invention.
Figure 12:
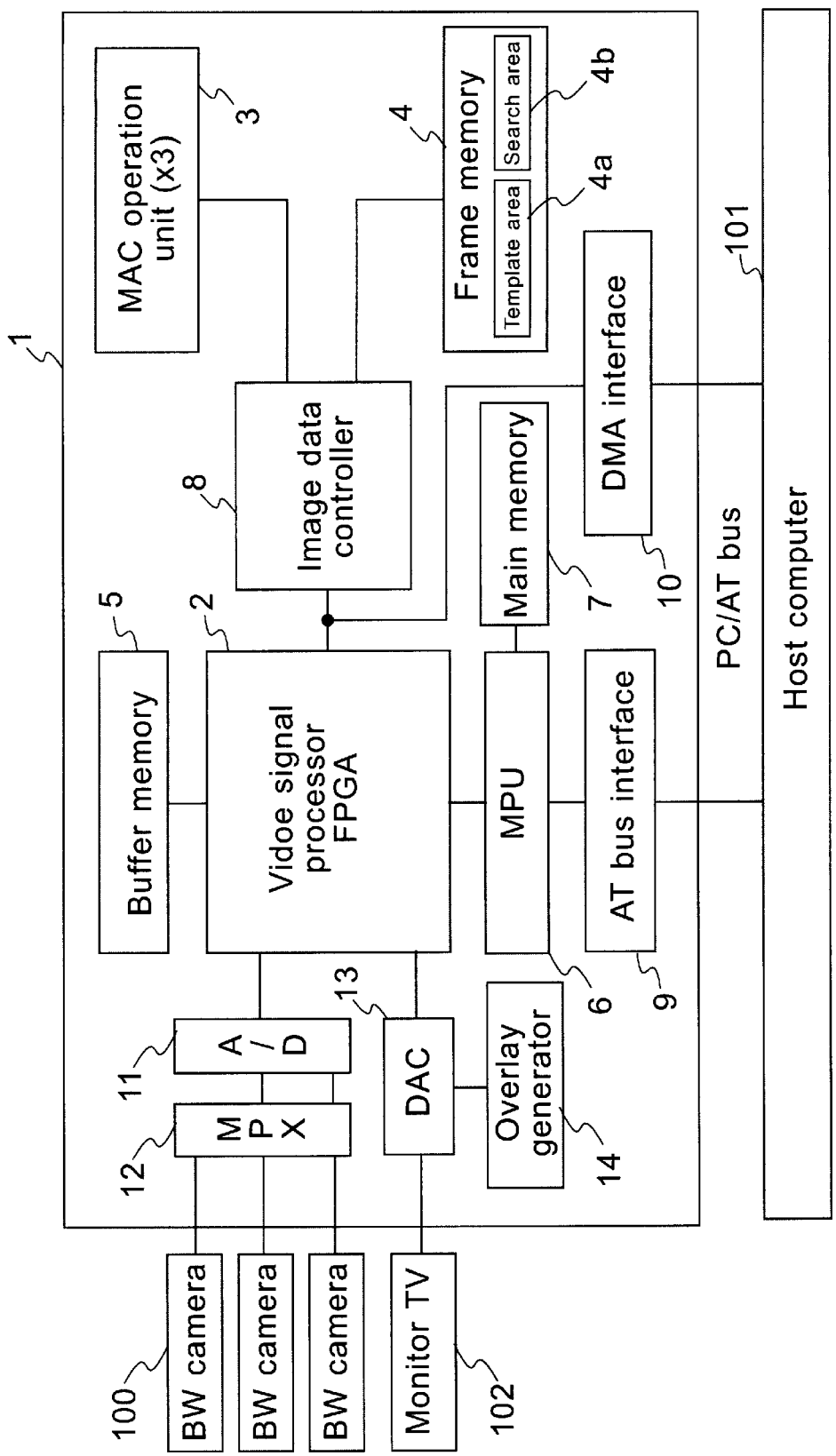
FIG. 12 is a block diagram illustrating an example internal arrangement of a pattern matching apparatus.

An arrangement example for the system of the present invention is shown in FIG. 11. A pattern matching apparatus 1 performs the matching of a template image and an image to be searched for. The pattern matching apparatus 1 is connected to a monochrome (BW) camera 100 for capturing an image to be searched for and a host computer 101 for generating a template image to be used as a reference image. An input image and an image processing result are output from the pattern matching apparatus 1 to a monitor TV 102. An internal arrangement example of the pattern matching apparatus 1 of the system of the present invention is shown in FIG. 12. A signal processor 2 for image processing is constituted by a dedicated gate array, etc. A multiplication and accumulation (hereinafter referred to as a MAC) operation unit 3 performs a MAC operation for a captured image to be searched for and for a template image. In a frame memory 4, a template area 4a and a search area 4b are memory areas. Reference numeral 5 denotes a buffer memory; 6, an MPU for controlling the entire system; 7, a main memory in which is stored a main control program for the MPU 6; and 8, an image data controller.

An AT bus interface 9 and a DMA interface 10 are connected to the host computer 101. In addition, these buses are connected to the BW camera 100 via an A/D circuit 11 and a multiplexer (MPX) 12, and to the monitor TV 102 via a D/A converter (DAC) 13, which is connected to an overlay generator 14.

The pattern matching process according to the present invention is performed by the signal processor 2 and the MAC operation unit 3, and the template area 4a and the search area 4b of the frame memory 4, and the buffer memory 5 are employed as image processing areas. Pattern matching programs shown in flowcharts in FIGS. 1 and 2 can be stored in a memory area in the main memory 7. These programs may be stored separately on a floppy disk, etc.

The pattern matching process according to the present invention will now be described.

Figure 3:
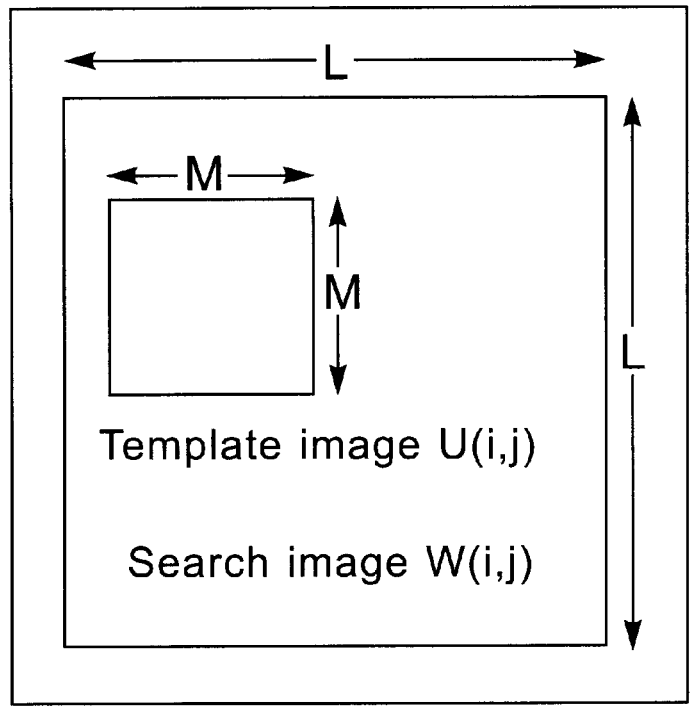
FIG. 3 is an explanatory diagram showing an example template image and an example search target image.
Figure 4:
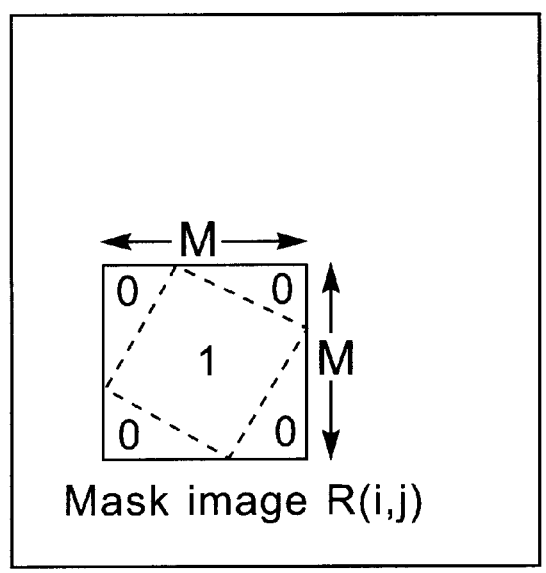
FIG. 4 is an explanatory diagram showing an example mask image.
Figure 5:
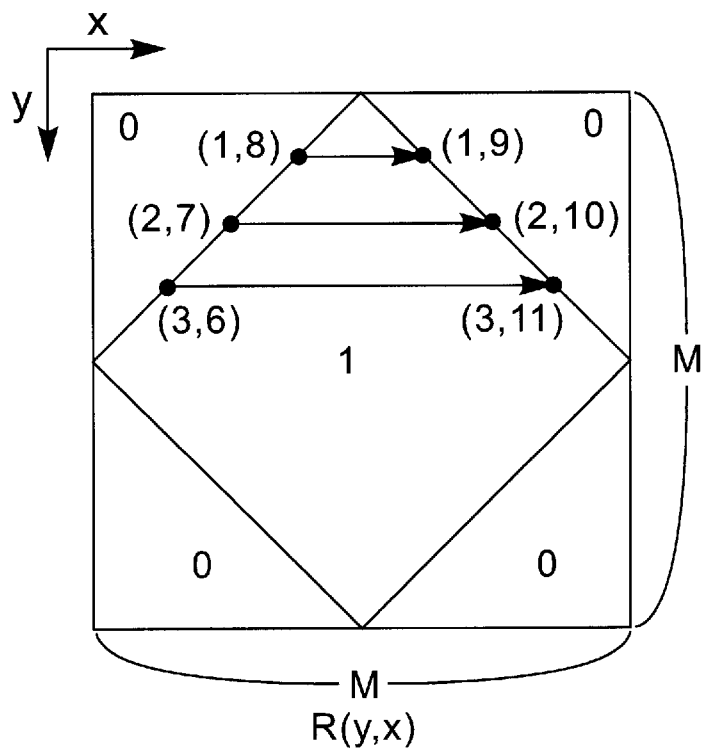
FIG. 5 is an explanatory diagram showing, in a mask image, coordinate sequence code for a sequence of pixels having values of "1."

In this embodiment, assume that template image $U(i, j)$ is formed of a rectangular area of M×M pixels, and a search target image $W(i, j)$ is formed of a rectangular area of L×L pixels, as is shown in FIG. 3 (M<L). Further, assume that mask image $R(i, j)$, including an insensitive region, has a sensitive region of "1" and insensitive regions of "0," as is shown in FIG. 4.

The basic points of this processing will first be explained based on equations (7) through (17). While referring to equations (1) through (4), normalized correlation factor Cr', when an insensitive region is present, is:

[Equation 7]

$$C'r = \frac{\sum_M \sum_M (U'(i,j) - \overline{U'}) \cdot (W'(i,j) - \overline{W'})}{\sqrt{\sum_M \sum_M (U'(i,j) - \overline{U'})^2 \sum_M \sum_M (W'(i,j) - \overline{W'})^2}} \quad (7)$$

[Equation 8]

$$\sigma_{U'W'}^2 = \frac{\sum_M \sum_M (U'(i,j) - \overline{U'}) \cdot (W'(i,j) - \overline{W'})}{M^2} \quad (8)$$

[Equation 9]

$$\sigma_{U'}^2 = \frac{\sum_M \sum_M (U'(i,j) - \overline{U'})^2}{M^2} \quad (9)$$

[Equation 10]

$$\sigma_{W'}^2 = \frac{\sum_M \sum_M (W'(i,j) - \overline{W'})^2}{M^2} \quad (10)$$

$\sigma_{U'}^2$ denotes a variance for the template image with mask U'(i,j) denotes a variance for the search target image W'(i, j), the same size as the template image, and $\sigma_{U'W'}^2$ denotes a covariance for the images U(i, j) and W(i, j).

$\overline{U'}$ and $\overline{W'}$ are represented as:

[Equation 11]

$$\overline{U'} = \frac{\sum_M \sum_M U(i,j) R(i,j)}{M_R^2} \quad (11)$$

[Equation 12]

$$\overline{W'} = \frac{\sum_M \sum_M W(i,j) R(i,j)}{M_R^2} \quad (12)$$

where the total of such pixels that mask image R(i, j) in FIG. 4 is "1" is $M_R^2$.

Image U'(i, j) is obtained by forcibly changing, to average value U', a pixel value for the template image U(i, j) that corresponds to the coordinates for the mask image R(i, j)=0. Image W'(i, j) is obtained by forcibly changing, to average value W'. a pixel value in the search target image W(i, j) that corresponds to coordinates for the mask image R(i, j)=0.

Variance $\sigma_{U'}^2$ for the template image U'(i, j) with mask, which is in the first term of the denominator in equation (7), is obtained before a search, and as is shown in the following equation,

[Equation 13]

$$\sum_M \sum_M (U'(i,j) - \overline{U'})^2 = A \quad (13)$$

the variance $\sigma_{U'}^2$ is constant.

On the other hand,

[Equation 14]

$$\sum_M \sum_M (W'(i,j) - \overline{W'})^2 = \quad (14)$$

-continued $$\sum_M \sum_M (W(i,j) R(i,j))^2 - \frac{1}{M_R^2}\left(\sum_M \sum_M W(i,j) R(i,j)\right)^2$$

is employed for variance $\sigma_{W'}^2$ for the search target image with mask, W'(i, j), which is the same size as the template image and which is the second term of the denominator in equation (7).

In addition, when

[Equation 15]

$$U''(i,j) = U'(i,j) - \overline{U'} \quad (15)$$

is employed to replace equation (7),

[Equation 16]

$$Cr = \frac{\sum_M \sum_M U''(i,j) W(i,j)}{\sqrt{A}\sqrt{\sum_M \sum_M (W(i,j) R(i,j))^2 - \frac{1}{M_R^2}\left(\sum_M \sum_M W(i,j) R(i,j)\right)^2}} \quad (16)$$

is obtained. It should be noted that, according to the definition,

[Equation 17]

$$\overline{W'} \sum_M \sum_M (U'(i,j) - \overline{U'}) = 0 \quad (17)$$

is employed to introduce equation (16).

As is described above, to obtain Cr', the following calculations are performed:

a) A MAC operation for a template image with a modified mask, U''(i, j) which is included in the numerator in equation (16), and a search target image, W(i, j) (the number of mutiplications is (L'M)²).

b) The multiplication of a mask and the search target image W(i, j) (the number of multiplications is (L'M)²).

c) The calculation of the sum and the squared sum of a search target image with a mask, W'(i, j), which is included in the denominator in equation (16) (the number of multiplications if (L¹M)²), In the previous explanation, however, the total number of multiplications is 3 (L¹M)², and a large number of calculations is still required.

The pattern matching process in this embodiment employs the result obtained by the calculation for the preceding search to considerably reduce the number of calculations that are required.

The pattern matching processing according to the present invention will now be described while referring to FIGS. 1 through 10.

Figure 1:
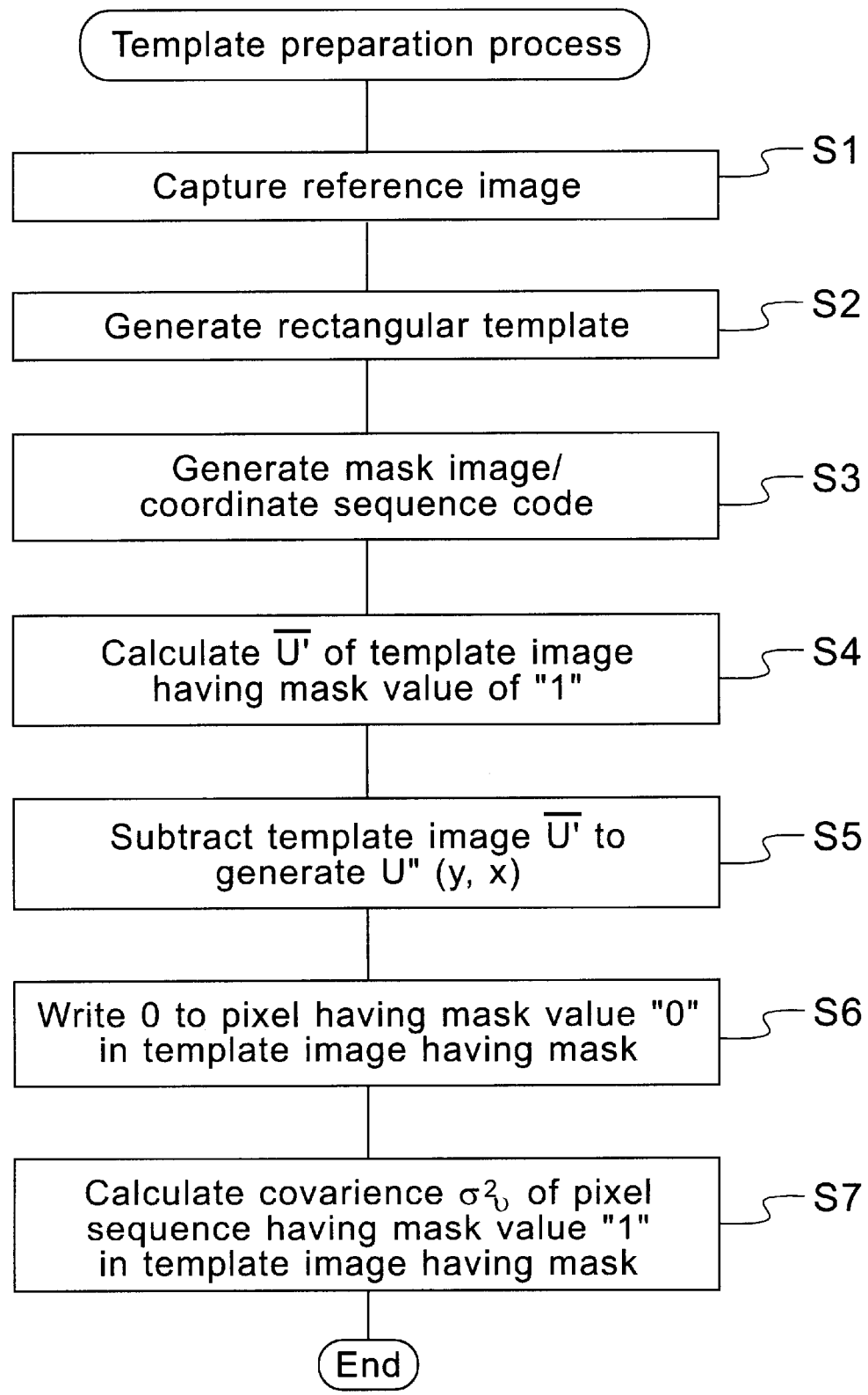
FIG. 1 is a flowchart showing template preparation processing according to one embodiment of the present invention.

First, the processing for preparing a template will be explained while referring to the flowchart shown in FIG. 1. At steps S1 and S2, a reference image is captured, and a partial image of this reference image is employed to prepare a rectangular template image U(i, j), as is shown in FIG. 3.

At step S3, mask image R(i, j), which is the same size (M×M) as the template image U(i, j), is generated, and coordinate sequence code is also created.

The coordinate sequence code will now be explained. In the mask image R(i, j) shown in FIG. 5, a coordinate sequence code of pixels having a value of "1" is generated, and coordinate sequences, as is shown in table 1, that each consist of a start point and an end point are generated. In the mask image R(i, j), 1 denotes a sensitive region and 0 denotes an insensitive region. The start point and the end point correspond to the image raster direction. The x coordinate for the end point is obtained by adding 1 to the original value.

TABLE 1

| Start point (y, x) | End point (y, x) |
|---|---|
| (1, 8) | (1, 9) |
| (2, 7) | (2, 10) |
| (3, 6) | (3, 11) |
| ... | ... |

At step S4, average value U', for the sequences of pixels that have the mask image R(i, j) value of "1," is acquired in the template image U(i, j).

At step S5, the average value U' is subtracted from the sequences of pixels having the mask image R(i, j) value of "1," and the template image having a modified mask in equation (15), U"(y, x), is generated in the template image U(i, j).

At step S6, "0s" are written to pixels having the mask image R(i, j) value of "0" in the template image having the modified mask, U"(i, j).

At step S7, as is shown in equation (13), covariance $\sigma^2_{U'}$, for a sequence of pixels having the mask image R(i, j) value of "1" is acquired in the template image with the modified mask, U"(i, j).

During the processing at steps S1 through S7, as described above, the template image having the modified mask, U"(i, j), which serves as a reference image, is generated.

Figure 2A:
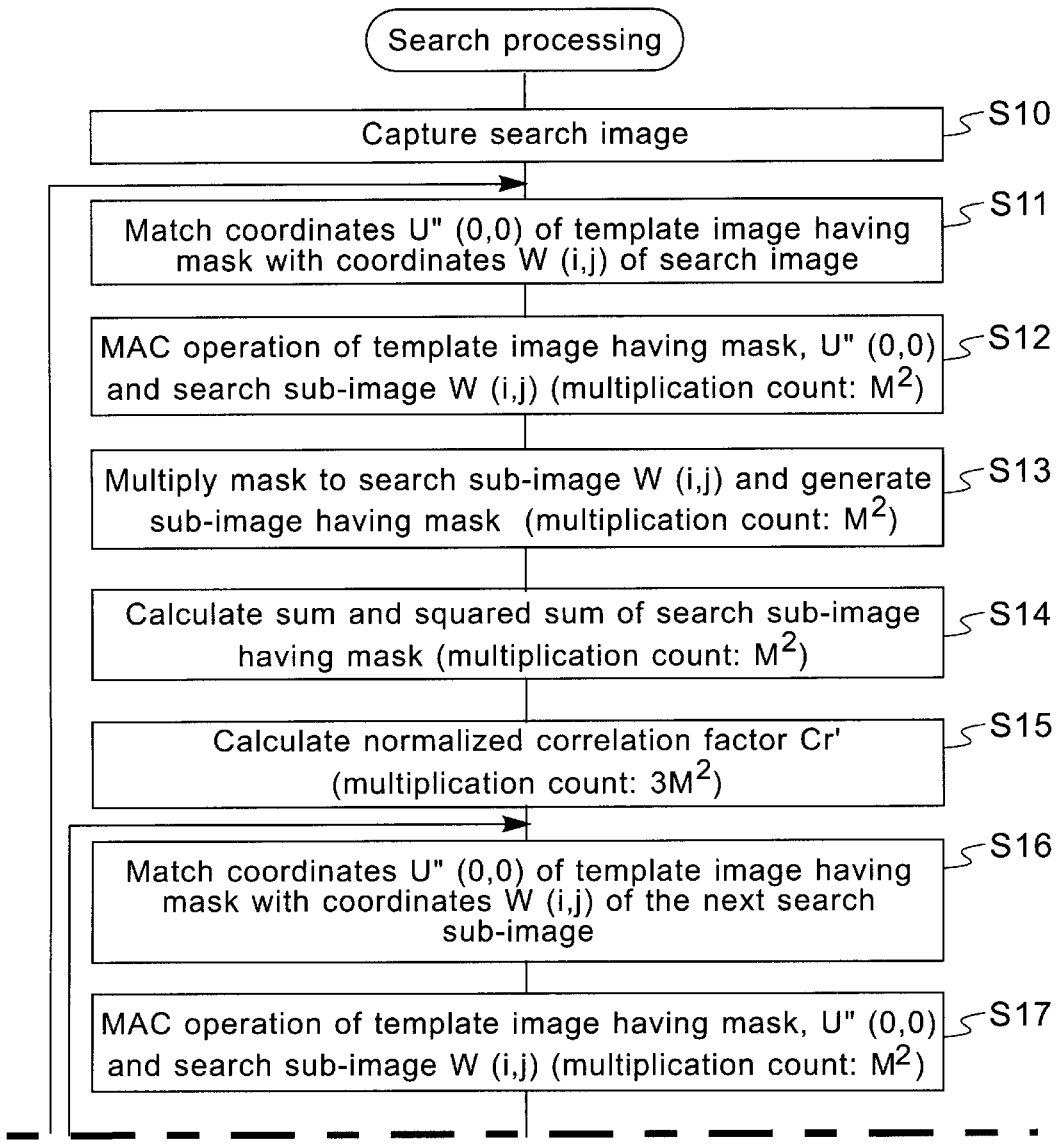
FIG. 2 is a flowchart showing search processing according to the embodiment of the present invention.
Figure 2B:
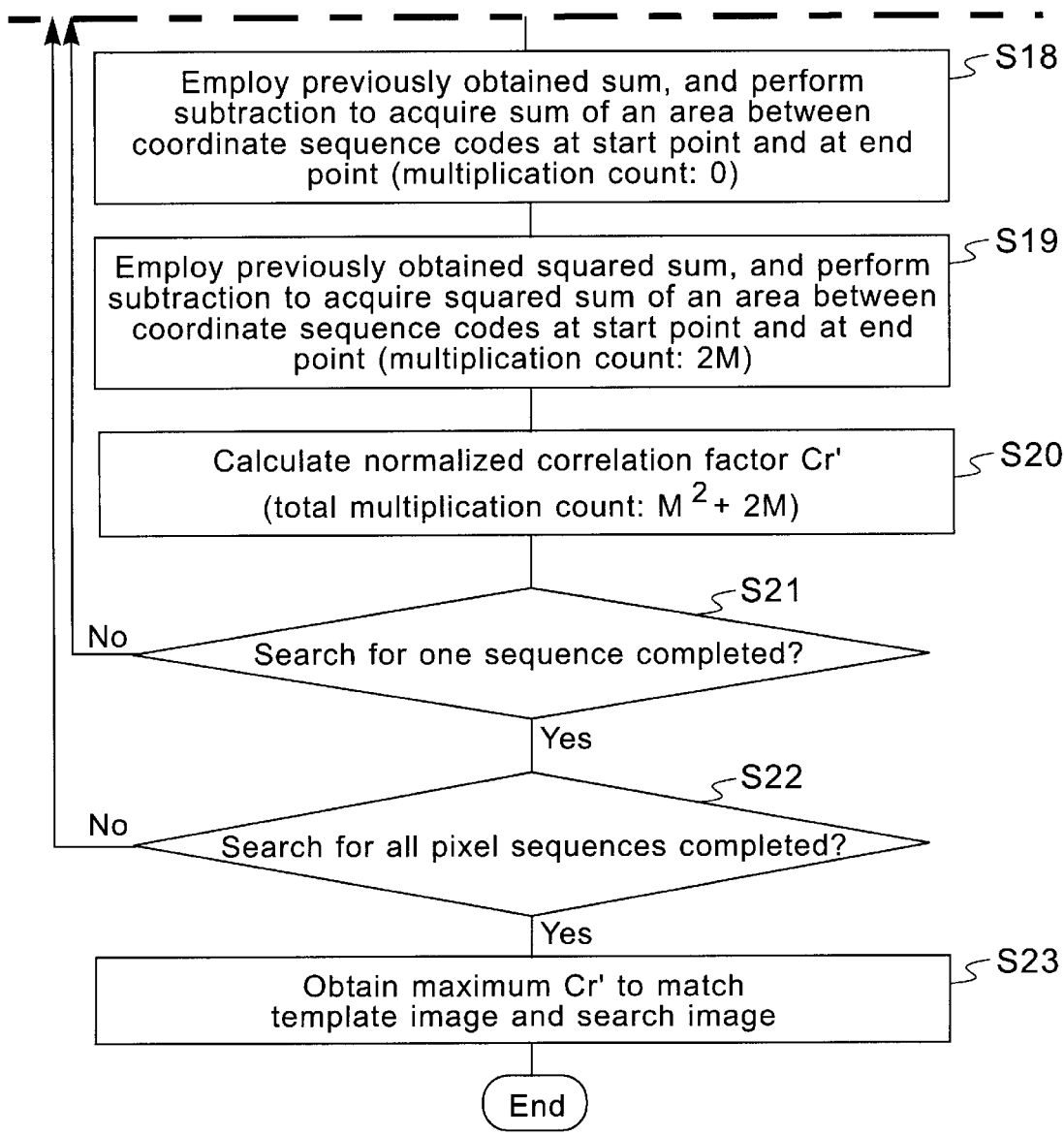

Next, the search processing that is performed following the template preparation processing will be described while referring to the flowchart in FIG. 2 (in this embodiment, an explanation will be given for one sequence of pixels for an image to be searched for).

Figure 6:
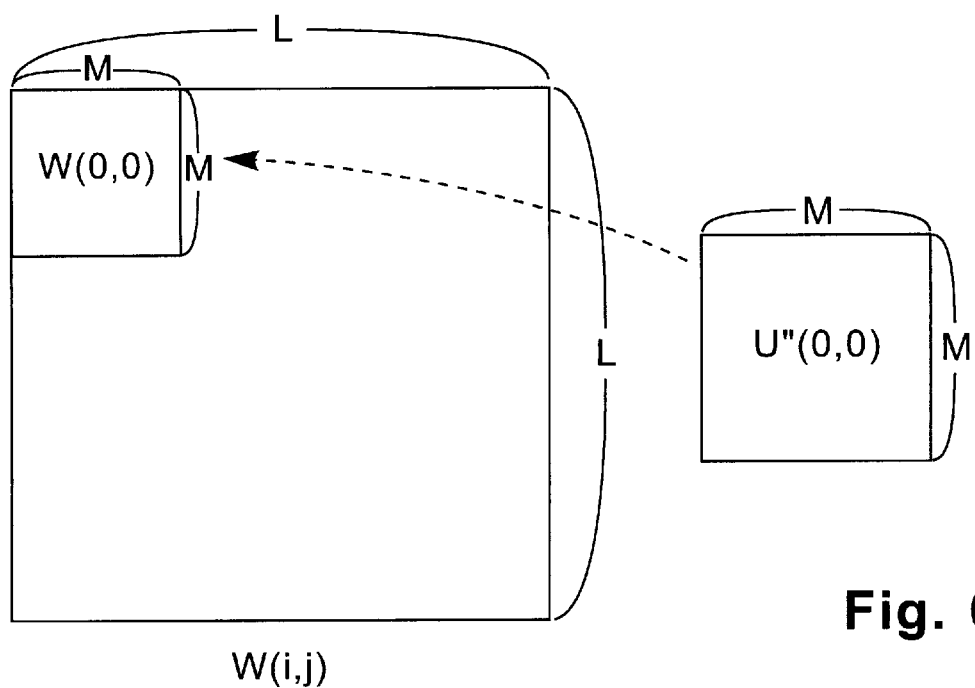
FIG. 6 is an explanatory diagram for the correspondence of a search target sub-image and a template image having a mask.

At step S10, an image to be searched for is captured. At step S11, as is shown in FIG. 6, matching is performed for coordinates U"(0, 0) of the template image having a modified mask and coordinates W(0, 0) in the upper left location of the search target image W(i, j).

At step S12, as is indicated by the numerator in equation (16), a MAC operation is performed for the template image having the modified mask and a search target sub-image whose upper left coordinates are W(0,0) (the number of multiplications is $M^2$).

Figure 7:
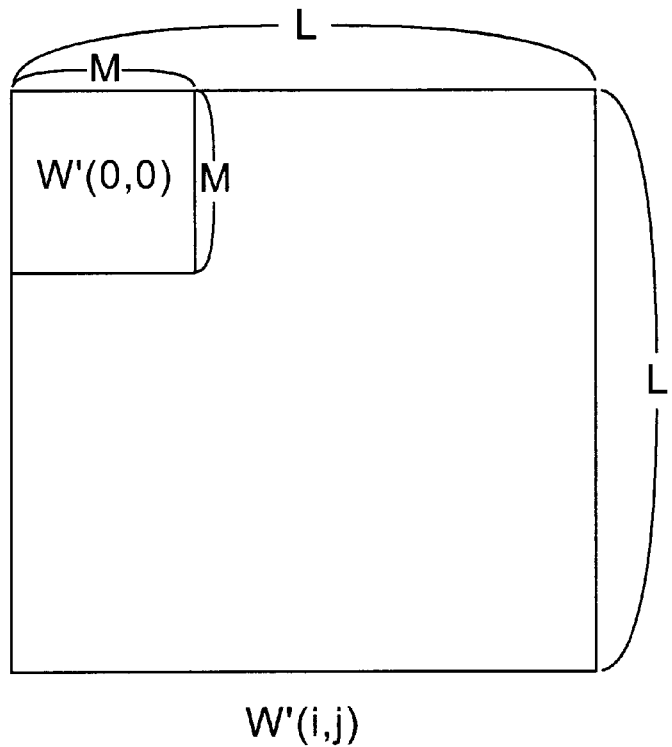
FIG. 7 is an explanatory diagram showing a search target sub-image having a mask.

At step S13, the search target sub-image having upper left coordinates of W(0, 0) is multiplied by a mask image, and as is shown in FIG. 7, a sub-image having a modified mask, W'(i, j) is generated (the number of calculations is $M^2$).

At step S14, as is indicated by the denominator in equation (16), the sum and the squared sum of the sub-images having modified masks, W'(i, j), are calculated (the number of multiplications is $M^2$).

Figure 8:
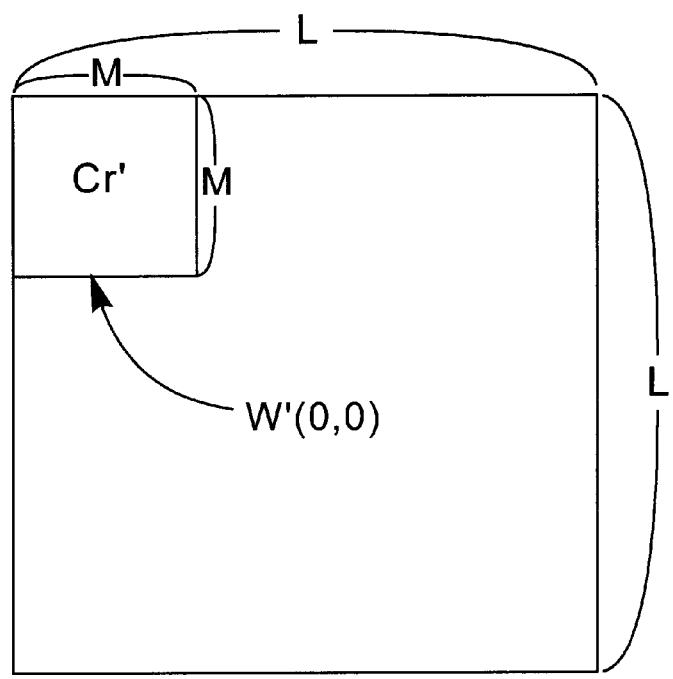
FIG. 8 is an explanatory diagram showing a normalized correlation factor in the search target sub-image having a mask.

At step S15, normalized correlation factor Cr' is calculated, as is shown by equation (16) and in FIG. 8.

The number of multiplications performed in the processing at steps S11 to S15 is approximately $3M^2$.

Figure 9:
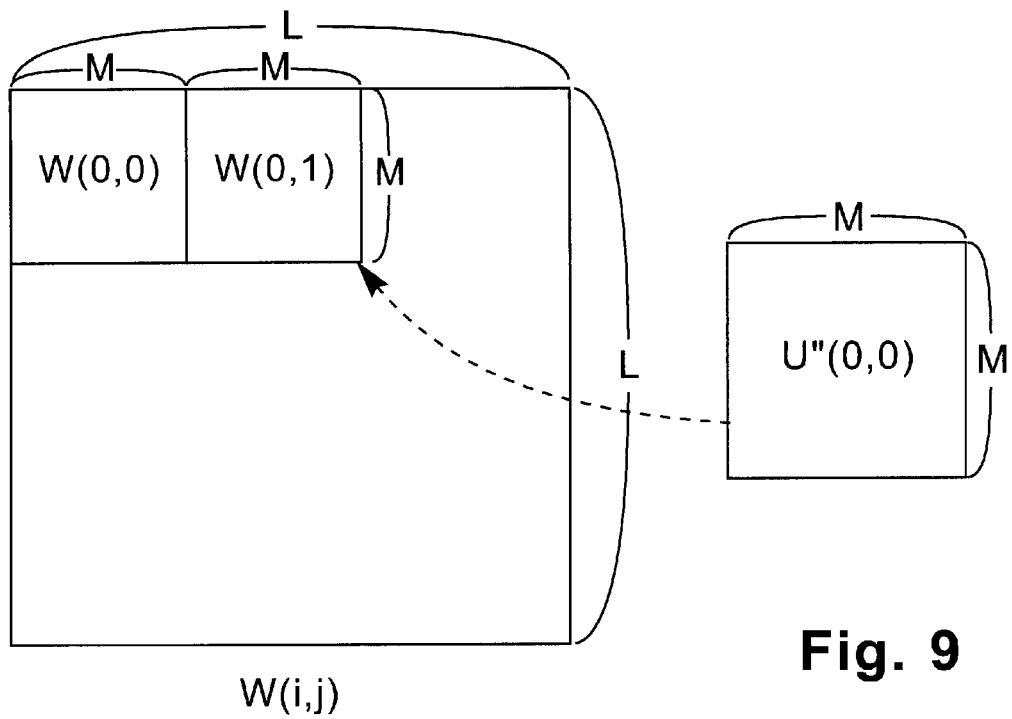
FIG. 9 is an explanatory diagram showing the correspondence of another search target sub-image in the same pixel sequence and the template image having a mask.

At step S16, the second region in the first pixel sequence is processed. That is, as is shown in FIG. 9, coordinates U"(0, 0) for a template image having a modified mask are matched with coordinates W(0, 1) in the search target image W(i, j).

At step S17, as is indicated by the numerator in equation (16), a MAC operation is performed for the template image having the modified mask and a sub-image to be searched for whose upper left coordinates are W(0, 1) (the number of multiplications is $M^2$)

At step S18, the value of a pixel sequence at the start point for the coordinate sequence code shown in table 1 is subtracted from the sum, obtained at step S14, of the sub-images having the modified masks, which have the left upper coordinates of W'(0, 0) that were obtained at the preceding step. Then, a pixel value for a pixel sequence at the end point of the coordinate sequence code is added to the result. The sum of the sub-images whose upper left coordinates are W'(0, 1) is calculated. Therefore, no multiplication is performed in this processing.

At step S19, the value of a pixel sequence at the start point for the coordinate sequence code shown in table 1 is subtracted from the squared sum, obtained at step S14, of the sub-images having the modified masks, which have the upper left coordinates of W'(0, 0) that were obtained at the previous step. Then, a pixel value for a pixel sequence at the end point of the coordinate sequence code is added to the result. The squared sum of the sub-images whose left upper coordinates are W'(0, 1) is calculated. The number of multiplications in this processing is 2M (it should be noted that the number of the coordinate sequence codes is X).

Figure 10:
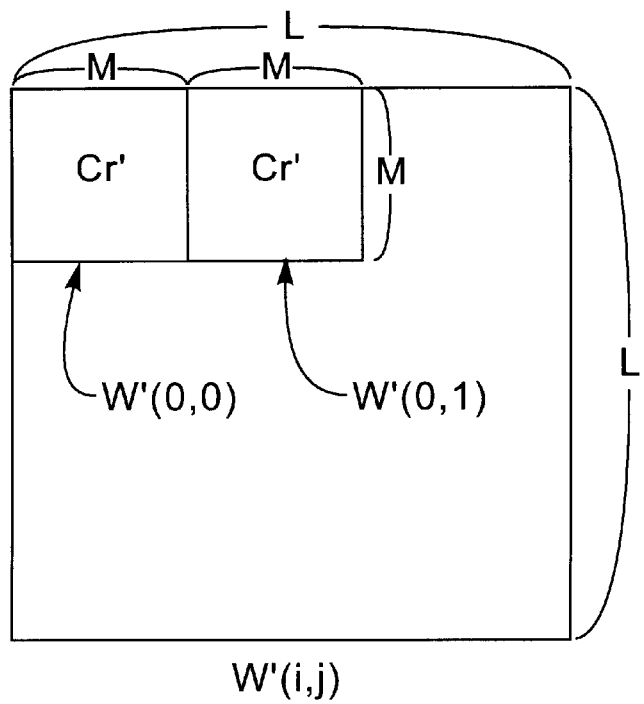
FIG. 10 is an explanatory diagram showing a normalized correlation factor in another search target image having a mask in the same pixel sequence.

At step S20, as is shown in equation (16) and in FIG. 10, normalized correlation factor Cr' is calculated when coordinates W'(0, 1) are employed as the upper left coordinates.

The number of multiplications performed in the processing at steps S16 to S20 is approximately. $M^2+2M$.

At step S21, a check is performed to determine whether the search of one pixel sequence has been completed. When the search for one pixel sequence has not yet been completed, program control returns to step S16, and the remaining normalized correlation factors Cr', in the same pixel sequence, are obtained in the above described manner.

When the search for one pixel sequence has been completed, program control advances to step S22, whereat a check is performed to determine whether the entire image has been searched. The total number of multiplications that have been performed when the search of one pixel sequence has been completed is approximately $3M^2 + (M^2+2M) \times (L'-1)$. When the search of the entire image has not yet been completed, program control returns to step S11, and the above described processing is repeated.

When the search of the entire image has been completed, program control moves to step S23. The maximum normalized correlation factor Cr' is acquired from the normalized correlation factors obtained for the entire area that is searched, so that matching of the template image and the search target image can be performed.

An explanation for this will be given by employing specific values.

To obtain the number of multiplications that are required to acquire the normalized correlation factor Cr' for one pixel sequence in a search target image, when M=100 and L'=400, using the calculation method of the present invention:

$$3M^2+(M^2+2M)\times(L'-1)$$

the number of multiplications=4099800, whereas, using the conventional calculation method:

$$3M^2 \times L',$$

the number of multiplications=12000000. Thus it is apparent that the method of the present invention can reduce the number of multiplications to about 1/3 of those required for the conventional method.

An example application of the system of the present invention shown in FIG. 12 will now be described.

An explanation will be given for an example for positioning a striking location for a lead frame. The interval of the lead frame having the highest density is about 200 μm. It is difficult to determine a striking location depending on the absolute position accuracy of an XY stage.

The striking location for all the leads are measured in advance by performing template matching, and a stage and a capillary are moved based on the measurement data. The system provided by this invention is employed for such control. An optical system is adjusted so that about 10 leads appear on a monitor, and at the time of teaching, a template is registered and striking locations positioned at units of 1/10 pixel are input to begin the control. In this case, accurate positioning can be performed by fast calculation processing.

What is claimed:

1. An image processing method for matching a template image and a search image comprising the steps of:

capturing a reference image to generate, from said captured image, a template image having an insensitive region and a sensitive region;

generating in an image raster direction in a mask image of the same size as said generated template image, based on a sequence of pixel values corresponding to said sensitive region, a coordinate sequence code having coordinates for a start point and for an end point of said sensitive region;

multiplying said mask image having said pixel values by said template image to acquire a variance for said template image having a mask;

capturing said search image, and obtaining a covariance for said captured image and said template image having said mask by performing a multiplication and accumulation operation for said captured image and said template image having a mask;

multiplying said search image by said mask image having said coordinate sequence of said pixel values and calculating the sum and the squared sum of a search image with a mask to be searched for;

subtracting said sum of said search image having said mask corresponding to pixel values for said coordinate sequence of said start points, from said sum of said search image having said mask corresponding to pixel values for said coordinate sequence of said end points;

subtracting said squared sum of said search image having said mask corresponding to pixel values for said coordinate sequence of said start points, from said squared sum of said search image having said mask corresponding to pixel values for said coordinate sequence of said end points;

acquiring, from said sum and said squared sum of said search image having said mask, a variance for said search image having said mask having the same size as said template image having said mask;

calculating a normalized correlation factor by employing said variance for said template image having said mask, said covariance and said variance for said search image having said mask being searched for; and determining whether said template image matches said image being searched for by calculating a coordinate value for which said normalized correlation factor is the maximum.

2. An image processing apparatus, for matching a template image and a search image, comprising:

means for capturing a reference image to generate, from said captured image, a template image having an insensitive region and a sensitive region;

means for generating in an image raster direction in a mask image of the same size as said generated template image, based on a sequence of pixel values corresponding to said sensitive region, a coordinate sequence code having coordinates for a start point and for an end point of said sensitive region;

means for multiplying said mask image having said pixel values by said template image to acquire a variance for said template image having a mask;

means for capturing said search image, and obtaining a covariance for said captured image and said template image having said mask by performing a multiplication and accumulation operation for said captured image and said template image having a mask;

means for multiplying said search image by said mask image having said coordinate sequence of said pixel values and for calculating the sum and the squared sum of a search image with a mask to be searched for;

means for subtracting said sum of said image having said mask corresponding to pixel values for said coordinate sequence of said start points, from said sum of said search image having said mask corresponding to pixel values for said coordinate sequence of said end points;

means for subtracting said squared sum of said search image having said mask corresponding to pixel values for said coordinate sequence of said start points, from said squared sum of said search image having said mask corresponding to pixel values for said coordinate sequence of said end points;

means for acquiring, from said sum and said squared sum of said search image having said mask, a variance for said search image having said mask having the same size as said template image having said mask;

means for calculating a normalized correlation factor by employing said variance for said template image having said mask, said covariance and said variance for said search image having said mask being searched for; and means for determining whether said template image matches said image being searched for by calculating a coordinate value for which said normalized correlation factor is the maximum.

3. An image processing apparatus according to claim 2, further comprising:

reference image preparation means for preparing said reference image; and search target image input means for capturing said image.

4. A recording medium on which is recorded a control program for enabling a computer to match a template image and a search image, said control program enabling said computer to perform the processes for:

capturing a reference image to generate, from said captured image, a template image having an insensitive region and a sensitive region;

generating in an image raster direction in a mask image of the same size as said generated template image, based on a sequence of pixel values corresponding to said sensitive region, a coordinate sequence code having coordinates for a start point and for an end point of said sensitive region;

multiplying said mask image that has said pixel values and said template image to acquire a variance for said template image having a mask;

capturing said search image, and obtaining a covariance for said captured image and said template image having said mask by performing a multiplication and accumulation operation for said captured image and said template image having a mask;

multiplying said search image by said mask image having said coordinate sequence of said pixel values and calculating the sum and the squared sum of a search image with a mask to be searched for;

subtracting said sum of said search image having said mask corresponding to pixel values for said coordinate sequence of said start points, from said sum of said search image having said mask corresponding to pixel values for said coordinate sequence of said end points;

subtracting said squared sum of said search image having said mask corresponding to pixel values for said coordinate sequence of said start points, from said squared sum of said search image having said mask corresponding to pixel values for said coordinate sequence of said end points;

acquiring, from said sum and said squared sum of said search image having said mask, a variance for said search image having said mask having the same size as said template image having said mask;

calculating a normalized correlation factor by employing said variance for said template image having said mask, said covariance and said variance for said search image having said mask being searched for; and determining whether said template image matches said image being searched for by calculating a coordinate value for which said normalized correlation factor is the maximum.

* * * * *